United States Patent [19]

Bunn et al.

[11] 4,398,559

[45] Aug. 16, 1983

[54] VALVE MEMBER AND ASSEMBLY WITH INLET AND OUTLET PRESSURE RELIEF GROOVES

[75] Inventors: Stuart E. Bunn; Herbert B. Owsley, both of Shawnee Mission, Kans.

[73] Assignee: Ball Valve Company, Inc., Olathe, Kans.

[21] Appl. No.: 420,819

[22] Filed: Sep. 21, 1982

Related U.S. Application Data

[63] Continuation-in-part of Ser. No. 191,015, Sep. 26, 1980, Pat. No. 4,350,179.

[51] Int. Cl.³ .............................................. F16K 15/06
[52] U.S. Cl. ........................... 137/516.15; 137/246.12; 137/514; 137/540; 137/DIG. 5
[58] Field of Search ............. 137/246.12, 484.2, 484.4, 137/472, 513.3, 513.5, 513.7, 540, 542, 543, DIG. 3, 516.15, 516.17, 516.19, 516.21, 516.23, 514, DIG. 5

[56] References Cited

U.S. PATENT DOCUMENTS

| | | | |
|---|---|---|---|
| 218,291 | 8/1879 | Loudon | 137/516.15 X |
| 306,686 | 10/1884 | Hills | 137/472 |
| 391,472 | 10/1888 | Hughes | 137/472 |
| 487,029 | 11/1892 | Gray et al. | 137/472 |
| 1,252,940 | 1/1918 | Osborne | 137/514.5 |
| 1,363,248 | 12/1920 | Gritzner | |
| 1,471,955 | 10/1923 | Grieve | |
| 1,560,235 | 11/1925 | Hinsch | |
| 1,718,350 | 6/1929 | Greenwald | 137/DIG. 5 |
| 1,768,638 | 7/1930 | Sheats | 137/514 |
| 2,023,915 | 12/1935 | Connell | |
| 2,299,847 | 10/1942 | Price | 137/540 |
| 2,406,243 | 8/1946 | Newton et al. | |
| 2,431,769 | 12/1947 | Parker | 137/514 X |
| 2,659,388 | 11/1953 | Rand | |
| 2,713,989 | 7/1955 | Bryant | |
| 3,037,523 | 6/1962 | Szaniszlo | 137/514 |
| 3,157,200 | 11/1964 | Rowan | |
| 3,219,063 | 11/1965 | Schumann et al. | |
| 3,245,429 | 4/1966 | Bacino et al. | |
| 3,341,028 | 3/1969 | Yoder | 137/513.5 X |
| 3,474,808 | 10/1969 | Elliott | 137/543 |
| 3,756,560 | 9/1973 | Siepmann | |
| 4,350,179 | 9/1982 | Bunn | 137/540 |

Primary Examiner—Robert G. Nilson
Attorney, Agent, or Firm—Litman, Day & McMahon

[57] ABSTRACT

A valve assembly and a valve member therefor including a fluid passage in the valve assembly with inlet and outlet portions and a valve seat. The valve member includes a valve member face selectively engaging the valve seat and defining a contact area therebetween with an inlet peripheral edge adjacent the passage inlet portion, and an outlet peripheral edge adjacent the passage outlet portion. An inlet pressure relief groove extends along one of the valve seat and the valve member face from the inlet peripheral edge to an interior portion of the contact area. An outlet pressure relief groove extends along one of the valve seat and the valve member face from the outlet peripheral edge to an interior portion of the contact area. The contact area includes a continuous sealing portion whereat the valve seat and the valve member face are in engagement for preventing fluid flow from the passage inlet portion to the passage outlet portion with the valve member in its closed position.

22 Claims, 7 Drawing Figures

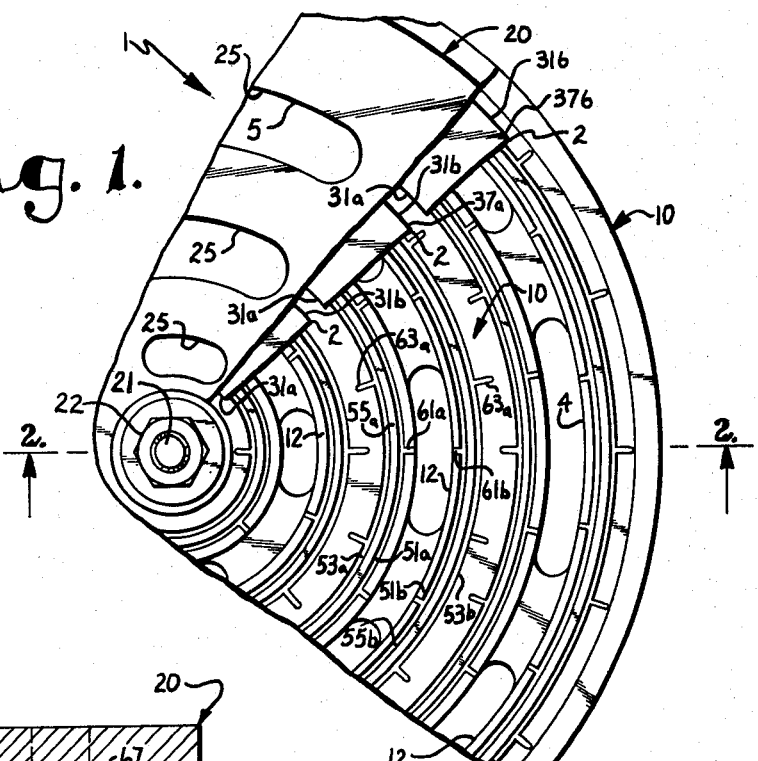
Fig. 1.
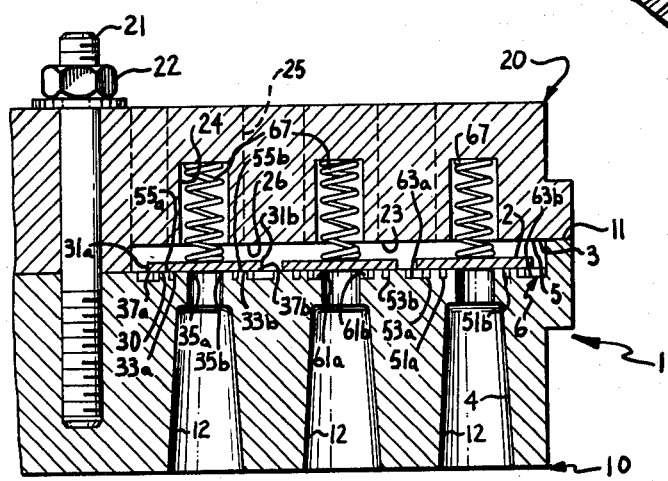
Fig. 2.
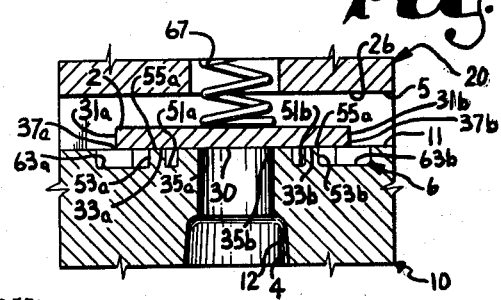
Fig. 3.
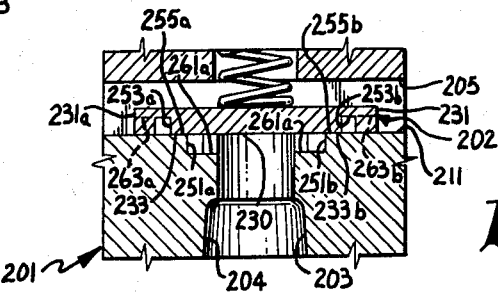
Fig. 4.
Fig. 5.

VALVE MEMBER AND ASSEMBLY WITH INLET AND OUTLET PRESSURE RELIEF GROOVES

CROSS REFERENCE TO RELATED APPLICATION

Continuation-in-part of U.S. Application Ser. No. 191,015 For VALVE ASSEMBLY WITH RELIEF GROOVE, filed Sept. 26, 1980, now U.S. Pat. No. 4,350,179.

BACKGROUND OF THE INVENTION

1. Field of the Invention

This invention relates to valves, in particular to valve assemblies having automatic-lift type valve members.

2. Description of the Prior Art

Compressors and pumps are commonly provided with valve assemblies having automatic-lift type valve members. The valve assemblies generally include a fluid passage having inlet and outlet portions with a valve seat therebetween. A typical automatic-lift type valve member includes a face for engaging the valve seat and preventing fluid flow between the passage inlet and outlet portions with the valve member in a closed position. The valve member is normally biased toward its closed position by a return spring or springs and is opened when fluid pressure in the passage inlet portion is sufficiently greater than that in the passage outlet portion. Such a pressure differential may be caused by, for example, the suction and discharge strokes of a reciprocating compressor piston.

The fluid pressure differential required to open the valve member is a function to several factors; including the amount of surface area on both sides of the valve member exposed to fluid pressure in the inlet and outlet portions of the passage, the amount of cohesion or "stiction" between the valve member face and the valve seat and the amount of force exerted by the return springs. In compressors, pumps and the like, reducing the fluid pressure differential required to open the valves will generally result in an increase in operating efficiency, because less "work" is thus required to move an equivalent amount of fluid and because lower fluid temperatures will be maintained.

Increasing operating efficiency is particularly desirable in compressors which are employed to transport large quantities of natural gas over great distances through pipelines from gas fields to consumers. Since natural gas engines often power such compressors, gas which is consumed thereby reduces the amount available for transmission and increases operating costs.

Reliability is also important in compressor valve assemblies because valve failures account for a large percentage of compressor downtime. Such downtime is particularly costly in natural gas transmission compressors because of the revenue loss which results from a suspension of operation. Also, if the compressor is located in a remote pumping station, additional downtime may be incurred while the necessary service personnel and parts are brought to the site.

A variety of different types of automatic lift-type valve assemblies have heretofore been proposed in an effort to achieve efficiency and reliability. For example, poppet valve assemblies with "poppets" comprising heads and guide stems are well known. Plate valve assemblies typically include a plurality of concentric, annular fluid inlet passages selectively sealed by respective concentric, annular plate valve members. Other types of automatic-lift type valve assemblies which may be encountered in compressors, pumps and the like include reed, channel, daisy and feather valve assemblies.

In operation, the valve members in such valve assemblies open and close very rapidly, e.g. one thousand times or more per minute, and strike respective valve seats with considerable force. It has been found that the useful life of such a valve member may be prolonged by providing a substantial contact area between the valve member face and the valve seat to absorb the shock upon engagement as the valve member closes. However, increasing the contact area may be detrimental to valve efficiency because less surface area on the inlet side of the valve member is thereby exposed to the fluid passage such that a greater inlet fluid pressure is required to open the valve member. Also, a greater cohesion or "stiction" between the faces is encountered. Therefore, the necessary fluid pressure differential for operation of the valve assembly tends to increase in proportion to the contact area with a corresponding decrease in efficiency.

Prior art valve assemblies with automatic-lift type valve members have heretofore not provided effective means for alleviating the efficiency problems caused by relatively large contact areas.

SUMMARY OF THE INVENTION

In the practice of the present invention, a valve assembly is provided which includes a fluid passage having inlet and outlet portions and a valve seat. A valve member includes a face for engaging the valve seat to define a contact area therebetween when in its closed position for blocking fluid flow from the passage inlet portion to the passage outlet portion. The contact area includes inlet and outlet peripheral edges adjacent the passage inlet and outlet portions respectively. A system of relief grooves on one or the other or both of the valve seat and the valve member face is provided for communicating fluid pressure to an interior portion of the contact area. The relief groove system includes inlet and outlet pressure intermediate grooves positioned in spaced relation from the contact area inlet and outlet peripheral edges and inlet and outlet pressure relief grooves which communicate the respective contact area peripheral edges and intermediate grooves.

The pressurized fluid communicated by the relief groove system to the contact area interior portion functions to facilitate opening the valve assembly with less fluid pressure differential than would otherwise be required. Greater efficiency in a fluid moving apparatus such as a compressor, pump or the like is thus achieved.

The principal objects of the present invention are: to provide a valve member and assembly with a relief groove system for exposing an interior portion of a contact area between a valve seat and valve member face to pressurized fluid exerting a lifting force against the valve member; to provide such a valve member and assembly which relieves or minimizes a cohesive seal between the valve seat and the valve member face; to provide such a valve member and assembly with a relief groove system for lowering a fluid differential required for opening the valve member; to provide such a valve member and assembly wherein the relief groove system communicates both inlet and outlet pressure to the contact area interior portion; to provide such a valve member and assembly adapted for increasing operating efficiency in a fluid moving apparatus; to provide such a valve assembly wherein the fluid is maintained at a lower temperature; to provide such a valve assembly which is adapted for achieving relatively high efficiency with a relatively large contact area between the valve member and the seat face; to provide such a valve member and assembly which is reliable in operation; to provide such a valve member and assembly which may be used for either suction or discharge; to provide such a valve member and assembly which are particularly well adapted for use in natural gas transmission compressors; to provide a relief groove system which is adapted for use in a variety of automatic-lift type valve assemblies; to provide such a relief groove system which is adapted for use in valve assemblies having poppets, plates, channels and the like; and to provide such a valve member and assembly which is economical to manufacture, efficient in use, capable of a long operating life, and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary, top plan view of a plate valve assembly embodying the present invention with portions thereof broken away to reveal internal construction.

FIG. 2 is a cross-sectional view of the plate valve assembly taken generally along line 2—2 in FIG. 1.

FIG. 3 is an enlarged, fragmentary, cross-sectional view of the plate valve assembly particularly showing a relief groove system.

FIG. 4 is an enlarged, fragmentary, cross-sectional view of a plate valve assembly comprising a first modified embodiment of the present invention.

FIG. 5 is an enlarged, fragmentary, cross-sectional view of a plate valve assembly comprising a second modified embodiment of the present invention.

DETAILED DESCRIPTION OF THE PREFERRED EMBODIMENT

Figure 6:
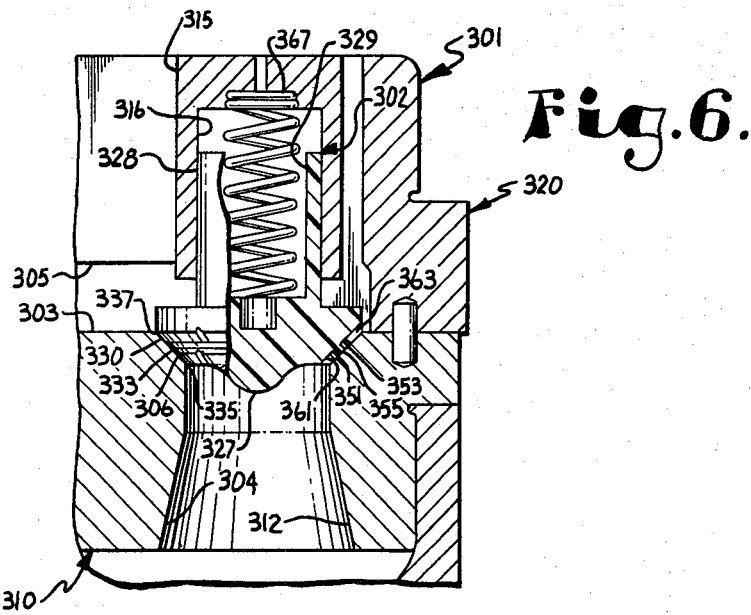
FIG. 6 is a fragmentary, cross-sectional view of a poppet valve assembly comprising a third modified embodiment of the present invention.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates a plate valve assembly having a plurality of concentric, annular plates or discs comprising plate valve members 2 and a relief groove system 6. A fluid flow passage 3 extends through the valve assembly 1 and includes inlet and outlet portions 4 and 5 respectively.

The valve assembly 1 includes a seat member 10 with a face comprising a valve seat 11. A plurality of concentric, annular inlet ports 12 comprising the fluid passage inlet portion 4 extend through the seat member 10 and terminate at the valve seat 11.

A cage member 20 is mounted on the seat member 10 by means of a centrally located stud 21 threadably receiving a lock nut 22. The cage member 20 includes a cage face 23 positioned in opposing relation to the valve seat 11 and having a plurality of valve return spring receivers 24 aligned in three concentric circles positioned over and concentric with corresponding inlet ports 12. A plurality of arcuate outlet ports 25 comprising part of the passage outlet portion 5 extend through the cage member 20 and are aligned in concentric circles. The outlet portion 5 of the fluid passage 3 also includes an outlet space 26 positioned between the valve seat 11 and the cage member 23 which communicates with the outlet ports 25.

Each valve member 2 comprises an annular disc or plate having a respective valve member face 30 and inner and outer margins 31a,b. The suffixes "a" and "b" are used herein to denote inner and outer respectively in relation to the valve assembly centers as at the stud 21. The valve members 2 are positioned in the outlet space 26 between the valve seat 11 and the cage member face 23. As shown in FIG. 2, with the valve members 2 in their respective closed positions inner and outer contact areas 33a,b are formed between the valve seat 11 and the valve member faces 30. Each contact area 33a,b includes inlet peripheral edges 35a,b at a respective inlet port 12 and outlet peripheral edges 37a,b at respective valve member margins 31a,b.

The plate valve assembly 1 heretofore described is of conventional design, the improvement of the present invention residing in the relief groove system 6 disclosed as follows.

The relief groove system 6 includes inlet pressure intermediate grooves 51a,b extending along the valve seat 11 in spaced relation from respective inlet peripheral edges 35a,b. Outlet pressure intermediate grooves 53a,b extend along the valve seat 11 in spaced relation from respective outlet peripheral edges 37a,b. The intermediate grooves 51a,b and 53a,b are concentric, annular and parallel with respect to the contact area peripheral edges 35a,b and 37a,b. Corresponding pairs of inlet and outlet pressure intermediate grooves 51a,b and 53a,b form continuous contact area sealing portions 55a,b therebetween.

Communicating the inlet pressure intermediate grooves 51a,b with respective inlet peripheral edges 35a,b are a plurality of annularly spaced inlet pressure relief grooves 61a,b extending radially along the valve seat 11. Communicating the outlet pressure intermediate grooves 53a,b with respective outlet peripheral edges 37a,b are a plurality of annularly spaced outlet pressure relief grooves 63a,b extending radially along the valve seat 11. As shown in FIG. 2, the inlet pressure relief grooves 61a,b open into respective inlet ports 12 at respective inlet peripheral edges 35a,b. The outlet pressure relief grooves 63a,b extend slightly beyond respective outlet peripheral edges 37a,b and are open to the outlet space 26 of the passage outlet portion 5.

The valve assembly 1 is adapted to function as either a suction or a discharge valve with the same inherent advantages in either mode of operation. In use as a suction valve assembly in a reciprocating type compressor (not shown), the valve assembly 1 is mounted in a valve pocket (also not shown) with its passage outlet portion 5 in communication with an end of the compressor cylinder. The passage inlet portion 4 communicates with a fluid inlet line (not shown). In use as a discharge valve, the passage inlet portion 4 communicates with an end of the compressor cylinder and the passage outlet portion 5 communicates with a discharge line (not shown).

The valve members 2 open when a fluid pressure in the inlet ports 12 is sufficiently greater than a fluid pressure in the passage outlet portion 5. The fluid pressure differential required across the valve assembly 1 to open the valve members 2 is a function the opposing force exerted by the valve return springs 67, the effect of a cohesion or "stiction" between the closely mating valve seat 11 and the valve member faces 30 and the respective surface areas of the valve members 2 exposed to inlet and outlet fluid pressure. With respect to the last-mentioned factor, increasing the area of the valve members faces 30 exposed to the inlet and outlet fluid pressure tends to reduce the fluid pressure differential required for opening because the lifting force exerted thereby is proportionately increased.

The relief groove system 6 of the present invention operably reduces the required fluid pressure differential in at least two ways. First of all, the cohesion or "stiction" between the valve seat 11 and the valve member faces 30 tends to be broken by the pressurized fluid admitted to interior portions of the contact areas 33a,b by the grooves 51a,b; 53a,b; 61a,b and 63a,b. Secondly, the relief groove system 6 exposes substantial portions of the valve member faces 30 to pressurized fluid from both the inlet and outlet portions 4 and 5 of the fluid passage 3. Thus, the total effective area of the valve member faces 30 exposed to fluid pressure exerting a lifting force is substantially greater than the area of the valve member faces 30 exposed to inlet fluid pressure at the inlet ports 12 alone.

In a compressor, valve assemblies 1 according to the present invention tend to open earlier during the compressor cycle than conventional valve assemblies. As a result, considerably less work is expended for a given capacity. Furthermore, fluid operating temperatures tend to be somewhat less when valve assemblies according to the present invention are employed because the fluid pressures within the passage inlet portion 4 tend to be somewhat lower. Hence, isothermal capacity is increased and compressor efficiency improved as compared to compressor operation with conventional valve assemblies.

By employing the relief groove system 6 of the present invention, relatively large contact areas 33a,b may be designed in the valve assembly 1 for distributing the closing impact of the valve member faces 30 on the valve seat 11. Distributing such impact forces tends to prolong the useful life of the valve members 2 and reduces downtime for valve assembly repair and replacement. The sealing portions 55a,b of the valve seat 11 may have thin, "knife edge" configurations and effectively block fluid flow between the passage inlet and outlet portions 4 and 5 with the valve members 2 in their respective closed positions.

A plate valve assembly 101 comprising a first modified embodiment of the present invention is shown in FIG. 4 and includes a plate valve member 102 having a relief groove system 106 thereon in an otherwise conventional plate valve assembly having a fluid passage 103 with inlet and outlet portions 104 and 105 respectively with a valve seat 111 positioned therebetween.

The valve member 102 displays a valve member face 130 with margins 131a,b. The valve seat and valve member face 111 and 130 engage as shown in FIG. 4 to form contact areas 133a,b therebetween with the valve member 102 in its closed position.

Inlet pressure intermediate grooves 151a,b and outlet pressure intermediate grooves 153a,b extend annularly and concentrically along the valve member face 130 in parallel, spaced relation with respect to the margins 131a,b and each other. Continuous, uninterrupted, sealing portions 155a,b of the contact areas 133a,b are positioned between corresponding pairs of inlet pressure intermediate grooves 151a,b and outlet pressure intermediate grooves 153a,b. The sealing portions 155a,b prevent fluid flow from the passage inlet portion 104 to the passage outlet portion 105 with the valve member 102 in its closed position.

A plurality of inlet pressure relief grooves 161a,b communicate the passage inlet portion 104 with respective inlet pressure intermediate grooves 151a,b. The inlet pressure relief grooves 161a,b extend radially along the valve member face 130 and are positioned in annularly spaced relation. A plurality of outlet pressure relief grooves 163a,b communicate the passage outlet portion 105 with the outlet pressure intermediate grooves 153a,b respectively. The outlet pressure relief grooves 163a,b extend radially along the valve member face 130 and are positioned in annularly spaced relation.

A plate valve assembly 201 comprising a second modified embodiment of the present invention is shown in FIG. 5 and includes a valve member 202. The valve assembly 201 includes a fluid passage 203 having inlet and outlet portions 204 and 205 respectively with a valve seat 211 positioned therebetween. The valve member 202 displays a valve member face 230 and margins 231a,b. The valve member face 230 engages the valve seat 211 and forms concentric, annular contact areas 233a,b therebetween.

Inlet pressure intermediate grooves 251a,b extend along the valve seat 211 in spaced relation from the passage inlet portion 204. Outlet pressure intermediate grooves 253a,b extend along the valve member face 230 in spaced relation from the valve member margins 231a,b respectively. The inlet and outlet pressure intermediate grooves 251a,b and 253a,b are concentric and parallel with the valve member margins 231a,b and with each other. Sealing portions 255a,b of the contact areas 233a,b are formed between corresponding pairs of inlet and outlet pressure intermediate grooves 251a,b and 253a,b. The contact area sealing portions 253a,b block fluid flow from the passage inlet portion 204 to the passage outlet portion 205 with the valve member 202 in its closed position.

A plurality of inlet pressure relief grooves 261a,b communicate the passage inlet portion 204 with the inlet pressure intermediate grooves 251a,b respectively. A plurality off outlet pressure relief grooves 263a,b communicate the passage outlet portion 205 with the outlet pressure intermediate grooves 253a,b. The inlet pressure relief grooves 263a,b extend radially along the valve seat 211 and are positioned in annularly spaced relation. The outlet pressure relief grooves 263a,b extend radially along the valve member face 230 and are positioned in annularly spaced relation.

Figure 7:
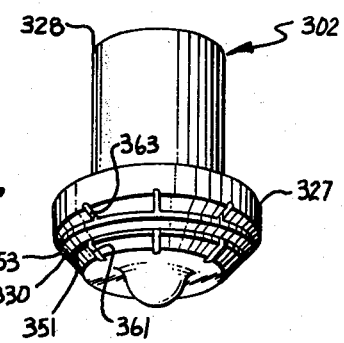
FIG. 7 is a perspective view of a poppet valve member for the poppet valve assembly.

A poppet valve assembly 301 comprising a third modified embodiment of the present invention is shown in FIGS. 6 and 7 and includes a plurality of poppets or poppet valve members such as that shown at 302. The valve assembly 301 inludes a fluid passage 303 having inlet and outlet portions 304 and 305. The fluid passage inlet portion 304 includes a plurality of inlet ports such as that shown at 312 each terminating at a respective beveled valve seat 311. The inlet port 312 extends through a seat member 310.

A cage member 320 is mounted on the seat member 310 and includes a plurality of substantially cylindrical guide bosses such as that shown at 315 each having a guide bore 316 extending coaxially therethrough.

The poppet valve assembly 301 comprises a conventional poppet valve assembly except that the poppets such as that shown at 302 embody a relief groove system 306 of the present invention. Thus, the improved poppet valve members 302 may be retrofitted in conventional poppet valve assemblies to improve the performance thereof.

Each poppet valve member 302 includes a head 327 with a beveled valve member face 330 thereon having a configuration matching that of the valve seat 311. A guide stem 328 extends coaxially from the head 327 and includes a counterbore 329 extending coaxially thereinto. The guide stem 328 is slidably received in the guide bore 316. A valve return spring 341 is received in the guide bore 316 and the counter bore 329 for urging the poppet valve member 302 to its closed position as shown in FIG. 6.

With the poppet valve member 302 in its closed position, the valve seat 311 and the valve member face 330 engage to form a contact area 333 therebetween. The contact area 333 includes inlet and outlet peripheral edges 335 and 337 at the fluid passage inlet and outlet portions 304 and 305 respectively.

Inlet and outlet pressure intermediate grooves 351 and 353 respectively extend along the valve member face 330 in spaced relation from the inlet and outlet peripheral edges 335 and 337 respectively. The inlet and outlet pressure intermediate grooves 351 and 353 respectively are concentric and parallel with the peripheral edges 335, 337 and with each other. A sealing portion 355 of the contact area 333 is formed between the inlet and outlet pressure intermediate grooves 351, 353 and functions to block fluid flow from the passage inlet portion 304 to the passage outlet portion 305 with the poppet valve member 302 in its closed position.

A plurality of inlet and outlet pressure relief grooves 361 and 363 respectively communicate the passage inlet and outlet portions 304 and 305 respectively with the inlet and outlet pressure intermediate grooves 351 and 353. The relief grooves 361 and 363 extend radially along the valve member face 330 and are positioned in annularly spaced relation.

Although the intermediate grooves 351, 353 and the relief grooves 361, 363 are shown extending along the valve member face 330, it will be appreciated that the relief groove system 306 may be formed entirely on the valve seat 311 or partly on the valve seat 311 and partly on the valve member face 330.

In operation, the relief groove systems 106, 206 and 306 of the modified valve assemblies 101, 201 and 301 and valve members 102, 202 and 302 respectively function in the same manner as the groove system 6 heretofore described in connection with the valve assembly 1 comprising the primary embodiment of the present invention.

It is to be understood that while certain forms of the present invention have been illustrated and described herein, it is not to be limited to the specific forms or arrangement of parts described and shown.

What is claimed and desired to secure by Letters Patent is as follows:

1. A valve member for selectively closing a fluid passage including inlet and outlet portions in a valve assembly having a valve seat, which comprises:
    (a) a valve member face engaging said valve seat to define a contact area therebetween when said valve member is in a closed position;
    (b) said contact area having inlet and outlet peripheral edges at said passage inlet and outlet portions respectively;
    (c) an inlet pressure relief groove extending along said valve member face from said inlet peripheral edge to an interior portion of said contact area;
    (d) an outlet pressure relief groove extending along said valve member face from said outlet peripheral edge to said contact area interior portion; and
    (e) said contact area including a sealing portion whereat said valve member face and said valve seat are in engagement for substantially preventing the flow of fluid between said passage inlet and outlet portions.

2. The valve member according to claim 1 which includes:
    (a) an inlet pressure intermediate groove extending along said valve member face in spaced relation from said peripheral edges and communicating with said inlet pressure relief groove.

3. The valve member according to claim 1 which includes:
    (a) an outlet pressure intermediate groove extending along said valve member face in spaced relation from said peripheral edges and communicating with said outlet pressure relief groove.

4. The valve member according to claim 1 wherein:
    (a) said valve member comprises an annular plate valve member with annular inner and outer margins.

5. The valve member according to claim 4 which includes:
    (a) said valve member in its closed position defining inner and outer contact areas with said valve seat adjacent said inner and outer margins respectively, each said contact area including inlet and outlet peripheral edges at said passage inlet and outlet portions respectively;
    (b) inner and outer inlet pressure relief grooves extending along said valve member face from said inner and outer inlet peripheral edges respectively to interior portions of said inner and outer contact areas respectively;
    (c) inner and outer outlet pressure relief grooves extending along said valve member face from said inner and outer outlet peripheral edges respectively to interior portions of said inner and outer contact areas respectively; and
    (b) said inner and outer contact areas including respective inner and outer sealing portions whereat said valve seat and said valve member face are in engagement for substantially preventing the flow of fluid between said passage inlet and outlet portions.

6. The valve member according to claim 5 which includes:
(a) inner and outer inlet intermediate grooves extending along said valve member face in spaced relation from said inner and outer inlet peripheral edges respectively and communicating with said inner and outer inlet relief grooves respectively; and
(b) inner and outer outlet intermediate grooves extending along said valve member face and positioned in spaced relation from said inner and outer outlet peripheral edges respectively and said inner and outer inlet intermediate grooves respectively, said inner and outer outlet intermediate grooves communicating with said inner and outer outlet relief grooves respectively.

7. The valve member according to claim 6 which includes:
(a) a plurality of said inlet pressure relief grooves extending radially along said valve member face in annularly spaced relation; and
(b) a plurality of said outlet pressure relief grooves extending radially along said valve member face in annularly spaced relation.

8. The valve member according to claim 1 wherein:
(a) said valve member comprises a poppet which includes:
(1) a head with said valve member face thereon; and
(2) a guide stem extending from said head.

9. The valve member according to claim 8 which includes:
(a) an inlet pressure intermediate groove extending along said valve member face in spaced relation from said inlet peripheral edge and communicating with said inlet pressure relief groove; and
(b) an outlet pressure intermediate groove extending along said valve member face in spaced relation from said outlet peripheral edge and said inlet pressure intermediate groove, said outlet pressure intermediate groove communicating with said outlet pressure relief groove.

10. The valve member according to claim 8 which includes:
(a) said head and said stem being coaxial with a longitudinal axis of said poppet;
(b) said valve member face being annular and concentric with said poppet head;
(c) a plurality of said inlet pressure relief grooves extending along said valve member face in annularly spaced relation; and
(d) a plurality of said outlet pressure relief grooves extending along said valve member face in annularly spaced relation.

11. A valve member for selectively closing a fluid passage including inlet and outlet portions in a valve assembly having a valve seat, which comprises:
(a) said valve member comprising an annular plate valve member with annular inner and outer margins;
(b) said valve member in its closed position defining inner and outer contact areas with said valve seat adjacent said inner and outer margins respectively, each said contact area including inlet and outlet peripheral edges at said passage inlet and outlet portions respectively;
(c) inner and outer inlet pressure relief grooves extending along said valve member face from said inner and outer inlet peripheral edges respectively to interior portions of said inner and outer contact areas respectively;
(d) inner and outer outlet pressure relief grooves extending along said valve member face from said inner and outer outlet peripheral edges respectively to interior portions of said inner and outer contact areas respectively;
(e) inner and outer inlet intermediate grooves extending along said valve member face in spaced relation from said inner and outer inlet peripheral edges respectively and communicating with said inner and outer inlet relief grooves respectively;
(f) inner and outer intermediate grooves extending along said valve member face in spaced relation from said inner and outer outlet peripheral edges respectively and said inner and outer inlet intermediate grooves respectively, said inner and outer outlet intermediate grooves communicating with said inner and outer outlet relief grooves respectively; and
(g) said inner and outer contact areas including respective inner and outer sealing portions whereat said valve seat and said valve member face are in engagement for preventing the flow of fluid between said passage inlet and outlet portions.

12. A valve assembly, which comprises:
(a) a fluid passage having an inlet portion and an outlet portion;
(b) a valve seat;
(c) a valve member having a valve member face adapted for selectively engaging said valve seat to define a contact area therebetween when said valve member is in a closed position;
(d) said contact area having inlet and outlet peripheral edges at said passage inlet and outlet portions respectively;
(e) an inlet pressure relief groove extending along one of said valve seat and said valve member face from said inlet peripheral edge to an interior portion of said contact area;
(f) an outlet pressure relief groove extending along one of said valve seat and said valve member face from said outlet peripheral edge to said contact area interior portion; and
(g) said contact area including a sealing portion whereat said valve member face and said valve seat are in engagement for substantially preventing the flow of fluid between said passage inlet and outlet portions.

13. The valve assembly according to claim 12 which includes:
(a) an inlet pressure intermediate groove extending along one of said valve seat and said valve member face in spaced relation from said inlet peripheral edge and communicating with said inlet pressure relief groove.

14. The valve assembly according to claim 12 which includes:
(a) an outlet pressure intermediate groove extending along one of said valve seat and said valve member face in spaced relation from said outlet peripheral edge and communicating with said outlet pressure relief groove.

15. The valve assembly according to claim 12 wherein:
(a) said valve member comprises an annular plate valve member with annular inner and outer margins.

16. The valve assembly according to claim 15 which includes:
   (a) said valve member in its closed position defining inner and outer contact areas with said valve seat adjacent said inner and outer margins respectively, each said contact area including inlet and outlet peripheral edges at said passage inlet and outlet portions respectively;
   (b) inner and outer inlet pressure relief grooves extending along one of said valve seat and said valve member face from said inner and outer inlet peripheral edges respectively to interior portions of said inner and outer contact areas respectively;
   (c) inner and outer outlet pressure relief grooves extending along one of said valve seat and said valve member face from said inner and outer outlet peripheral edges respectively to interior portions of said inner and outer contact areas respectively; and
   (d) said inner and outer contact areas including respective inner and outer sealing portions whereat said valve seat and said valve member face are in engagement for substantially preventing the flow of fluid between said passage inlet and outlet portions.

17. The valve assembly according to claim 16 which includes:
   (a) inner and outer inlet intermediate grooves extending along one of said valve seat and said valve member face in spaced relation from said inner and outer inlet peripheral edges respectively and communicating with said inner and outer inlet relief grooves respectively; and
   (b) inner and outer outlet intermediate grooves extending along one of said valve seat and said valve member face and positioned in spaced relation from said inner and outer outlet peripheral edges respectively and said inner and outer inlet intermediate grooves respectively, said inner and outer outlet intermediate grooves communicating with said inner and outer outlet relief grooves respectively.

18. The valve assembly according to claim 17 which includes:
   (a) a plurality of said inlet pressure relief grooves extending radially in annularly spaced relation along one of said valve seat and said valve member face; and
   (b) a plurality of said outlet pressure relief grooves extending radially in annularly spaced relation along one of said valve seat and said valve member face.

19. The valve assembly according to claim 12 wherein:
   (a) said valve member comprises a poppet which includes:
      (1) a head with said valve member face thereon; and
      (2) a guide stem extending from said head.

20. The valve assembly according to claim 19 includes:
   (a) an inlet pressure intermediate groove extending along one of said valve seat and said valve member face in spaced relation from said inlet peripheral edge and communicating with said inlet pressure relief groove; and
   (b) an outlet pressure intermediate groove extending along one of said valve seat and said valve member face in spaced relation from said outlet peripheral edge and said inlet pressure intermediate groove, said outlet pressure intermediate groove communicating with said outlet pressure relief groove.

21. The valve assembly according to claim 19 which includes:
   (a) said head and said stem being coaxial with a longitudinal axis of said poppet;
   (b) said valve member face being annular and concentric with said poppet head;
   (c) a plurality of said inlet pressure relief grooves extending along one of said valve seat and said valve member face in annularly spaced relation; and
   (d) a plurality of said outlet pressure relief grooves extending along one of said valve seat and said valve member face in annularly spaced relation.

22. A plate valve assembly, which comprises:
   (a) a fluid passage having an inlet portion and an outlet portion;
   (b) a valve seat;
   (c) an annular plate valve member with annular inner and outer margins;
   (d) said valve member in its closed position defining inner and outer contact areas with said valve seat adjacent said inner and outer margins respectively, each said contact area including inlet and outlet peripheral edges at said passage inlet and outlet portions respectively;
   (e) inner and outer inlet pressure relief grooves extending along one of said valve seat and said valve member face from said inner and outer inlet peripheral edges respectively to interior portions of said inner and outer contact areas respectively;
   (f) inner and outer outlet pressure relief grooves extending along one of said valve seat and said valve member face from one of said inner and outer outlet peripheral edges respectively to interior portions of said inner and outer contact areas respectively;
   (g) inner and outer inlet intermediate grooves extending along one of said valve seat and said valve member faces in spaced relation from said inner and outer inlet peripheral edges respectively and communicating with said inner and outer inlet relief grooves respectively;
   (h) inner and outer outlet intermediate grooves extending along one of said valve seat and one said valve member face and positioned in spaced relation from said inner and outer outlet peripheral edges respectively and said inner and outer inlet intermediate grooves respectively, said inner and outer outlet intermediate grooves communicating with said inner and outer outlet relief grooves respectively; and
   (i) said inner and outer contact areas including respective inner and outer sealing portions whereat said valve seat and said valve member face are in engagement for substantially preventing the flow of fluid between said passage inlet and outlet portions.

* * * * *